United States Patent
Han et al.

(10) Patent No.: US 10,642,782 B2
(45) Date of Patent: May 5, 2020

(54) MULTI-CORE PROCESSOR AND OPERATION METHOD THEREOF

(71) Applicant: Electronics and Telecommunications Research Institute, Daejeon (KR)

(72) Inventors: Jin Ho Han, Seoul (KR); Kyoung Seon Shin, Sejong-si (KR); Young-Su Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 196 days.

(21) Appl. No.: 15/832,824

(22) Filed: Dec. 6, 2017

(65) Prior Publication Data

US 2018/0165246 A1   Jun. 14, 2018

(30) Foreign Application Priority Data

Dec. 8, 2016 (KR) .................. 10-2016-0167058
Oct. 23, 2017 (KR) .................. 10-2017-0137675

(51) Int. Cl.
| | |
|---|---|
| G06F 11/00 | (2006.01) |
| G06F 15/80 | (2006.01) |
| G06F 9/30 | (2018.01) |
| G06F 11/07 | (2006.01) |
| G06F 12/0842 | (2016.01) |

(Continued)

(52) U.S. Cl.
CPC .......... *G06F 15/80* (2013.01); *G06F 9/30138* (2013.01); *G06F 11/073* (2013.01); *G06F 11/0724* (2013.01); *G06F 11/0793* (2013.01);

*G06F 11/1641* (2013.01); *G06F 11/1654* (2013.01); *G06F 11/18* (2013.01); *G06F 11/3055* (2013.01); *G06F 11/3058* (2013.01);

(Continued)

(58) Field of Classification Search
CPC combination set(s) only.
See application file for complete search history.

(56) References Cited

U.S. PATENT DOCUMENTS

| | | |
|---|---|---|
| 6,591,335 B1 | 7/2003 | Sade et al. |
| 7,328,391 B2 | 2/2008 | Hart et al. |

(Continued)

FOREIGN PATENT DOCUMENTS

JP   2012-63828 A   3/2012

*Primary Examiner* — Charles Ehne
(74) *Attorney, Agent, or Firm* — Rabin & Berdo, P.C.

(57) ABSTRACT

A multi-core processor having a first operation mode in which processors perform the same task and a second operation mode in which the processors perform different tasks includes first and second processors configured to write an operation mode value to a first register or second register when a function called in executed software requests the first or second operation mode, a manager configured to assign core IDs of the first and second processors according to the operation mode value stored in the first register or second register, and a reset controller configured to reset the first and second processors in response to the function, wherein the manager assigns the same core ID to the first and second processors when the operation mode value indicates the first operation mode, and allocates different core IDs to the first and second processors when the operation mode value indicates the second operation mode.

15 Claims, 5 Drawing Sheets

(51) Int. Cl.
    *G06F 11/16*     (2006.01)
    *G06F 11/18*     (2006.01)
    *G06F 11/30*     (2006.01)

(52) U.S. Cl.
    CPC .... *G06F 12/0842* (2013.01); *G06F 2201/845* (2013.01); *G06F 2212/6012* (2013.01)

(56) References Cited

U.S. PATENT DOCUMENTS

| | | |
|---|---|---|
| 7,966,514 B2 | 6/2011 | Surasinghe |
| 8,051,247 B1 | 11/2011 | Favor et al. |
| 8,533,572 B2 | 9/2013 | Lu et al. |
| 8,924,772 B2 | 12/2014 | Abe |
| 2009/0240979 A1* | 9/2009 | Campini ............. G06F 11/0724 714/11 |
| 2013/0318310 A1* | 11/2013 | Yamauchi ................ G06F 12/00 711/151 |
| 2014/0181596 A1* | 6/2014 | Rusu ................... G06F 11/3409 714/47.3 |
| 2015/0095705 A1* | 4/2015 | Raj ..................... G06F 11/0772 714/34 |
| 2015/0212905 A1* | 7/2015 | Gschwind ........... G06F 11/1474 714/42 |
| 2016/0110250 A1 | 4/2016 | Han et al. |
| 2016/0334467 A1 | 11/2016 | Cho et al. |

\* cited by examiner

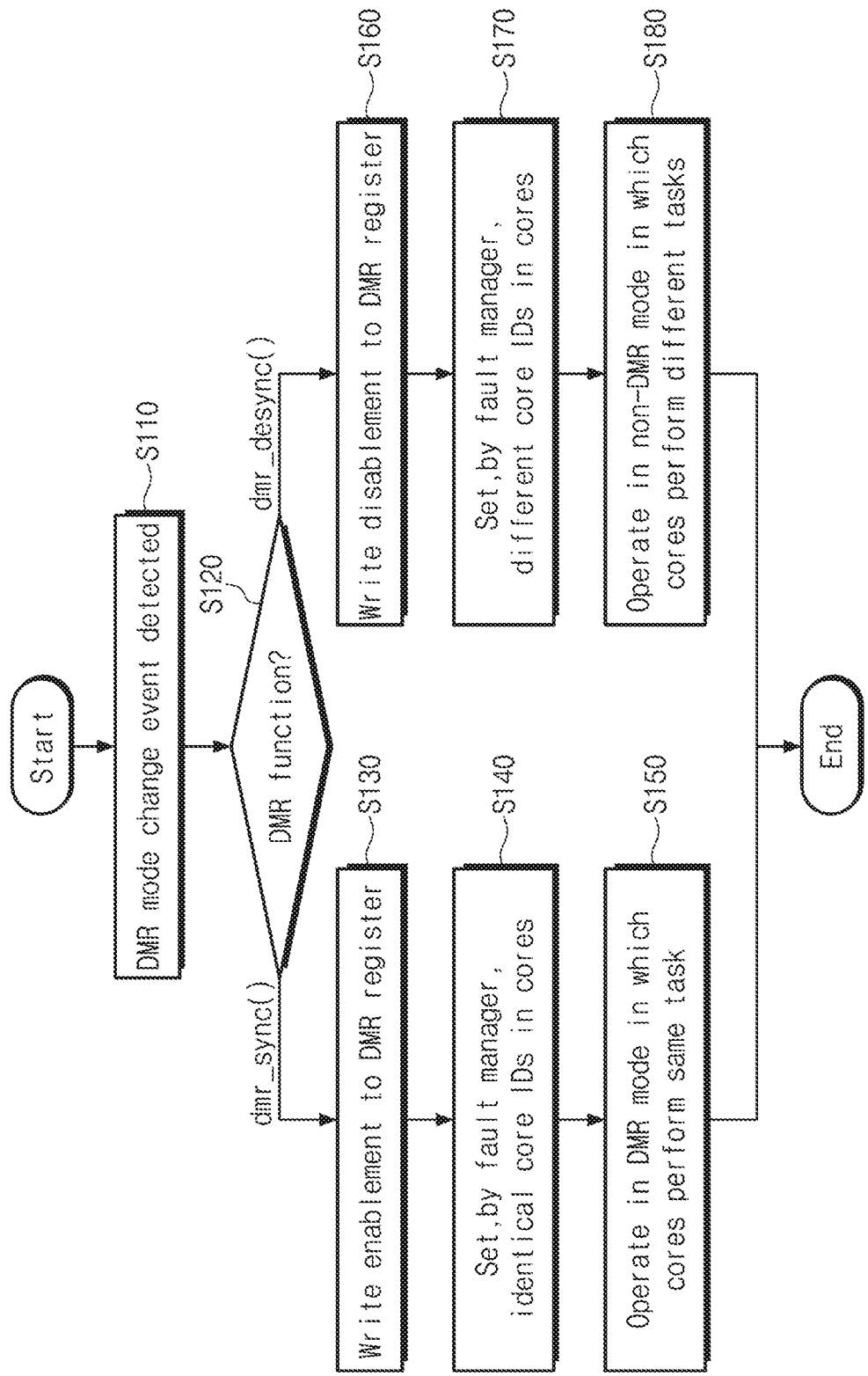

MULTI-CORE PROCESSOR AND OPERATION METHOD THEREOF

CROSS-REFERENCE TO RELATED APPLICATIONS

This U.S. non-provisional patent application claims priority under 35 U.S.C. § 119 of Korean Patent Application Nos. 10-2016-0167058, filed on Dec. 8, 2016, and 10-2017-0137675, filed on Oct. 23, 2017, the entire contents of which are hereby incorporated by reference.

BACKGROUND

The present disclosure herein relates to a processor, and more particularly, to a multi-core processor and a method for operating the same.

Processors such as central processing units (CPUs) are widely applied in the field of system semiconductors. Processor cores are becoming widely used in various application areas in which data processing is required. For example, in the field of vehicle systems, driver assistance systems which require high-level intelligence and precision, such as an advanced driver assistance system (ADAS), are actively being developed. In particular, high-performance processor cores are actively being applied to vehicle systems to recognize, instead of a driver, an external environment of a vehicle.

A processor may read a program from a main memory to perform a calculation according to a procedure. The processor may store a calculation result (i.e., processing result) in the main memory. An operation fault of the processor may be detected by monitoring data generated by the processor or data transferred to the main memory in order to ensure high reliability of calculation. In some cases, the operation fault of the processor may be recovered using a result of monitoring data stored in the main memory.

A multi-core technology is used to provide high performance and high reliability required for systems. For example, a plurality of cores may individually operate to improve a calculation processing speed. On the contrary, when high reliability is required, the plurality of cores may perform the same task to reduce the probability of occurrence of a fault. In addition, a multi-core technology is being actively applied to various mobile devices to satisfy the requirements of high performance and high reliability.

SUMMARY

The present disclosure provides a multi-core processor capable of variably changing an operation mode and easily detecting and correcting an operation fault.

The present disclosure also provides an efficient operating method for ensuring high performance and high reliability of a multi-core processor.

An embodiment of the inventive concept provides a multi-core processor having a first operation mode in which processors perform the same task and a second operation mode in which the processors perform different tasks, the multi-core processor including: a first processor and a second processor configured to write an operation mode value to a first register or a second register when a function called in executed software requests the first operation mode or the second operation mode; a manager configured to assign core IDs of the first processor and the second processor according to the operation mode value stored in the first register or the second register; and a reset controller configured to reset the first processor and the second processor in response to the function, wherein the manager assigns the same core ID to the first processor and the second processor when the operation mode value indicates the first operation mode, and allocates different core IDs to the first processor and the second processor when the operation mode value indicates the second operation mode.

In an embodiment of the inventive concept, a method for operating a multi-core processor having a first operation mode in which processors perform the same task and a second operation mode in which the processors perform different tasks includes: detecting whether a function of software executed in the first processor or the second processor requests a change to one of the first operation mode and the second operation mode; setting a first register included in the first processor or a second register included in the second processor according to a result of the detecting; resetting the first processor and the second processor; and assigning core IDs of the first processor and the second processor, wherein the first processor and the second processor are assigned the same core ID when an operation mode value set in the first register or the second register corresponds to the first operation mode, and the first processor and the second processor are assigned different core IDs when the operation mode value set in the first register or the second register corresponds to the second operation mode.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 5 is a flowchart illustrating operation of a multi-core processor according to an embodiment of the inventive concept.

DETAILED DESCRIPTION

Exemplary embodiments of the inventive concept will be described in detail with reference to the accompanying drawings so that those skilled in the art can easily implement the inventive concept.

Figure 1:
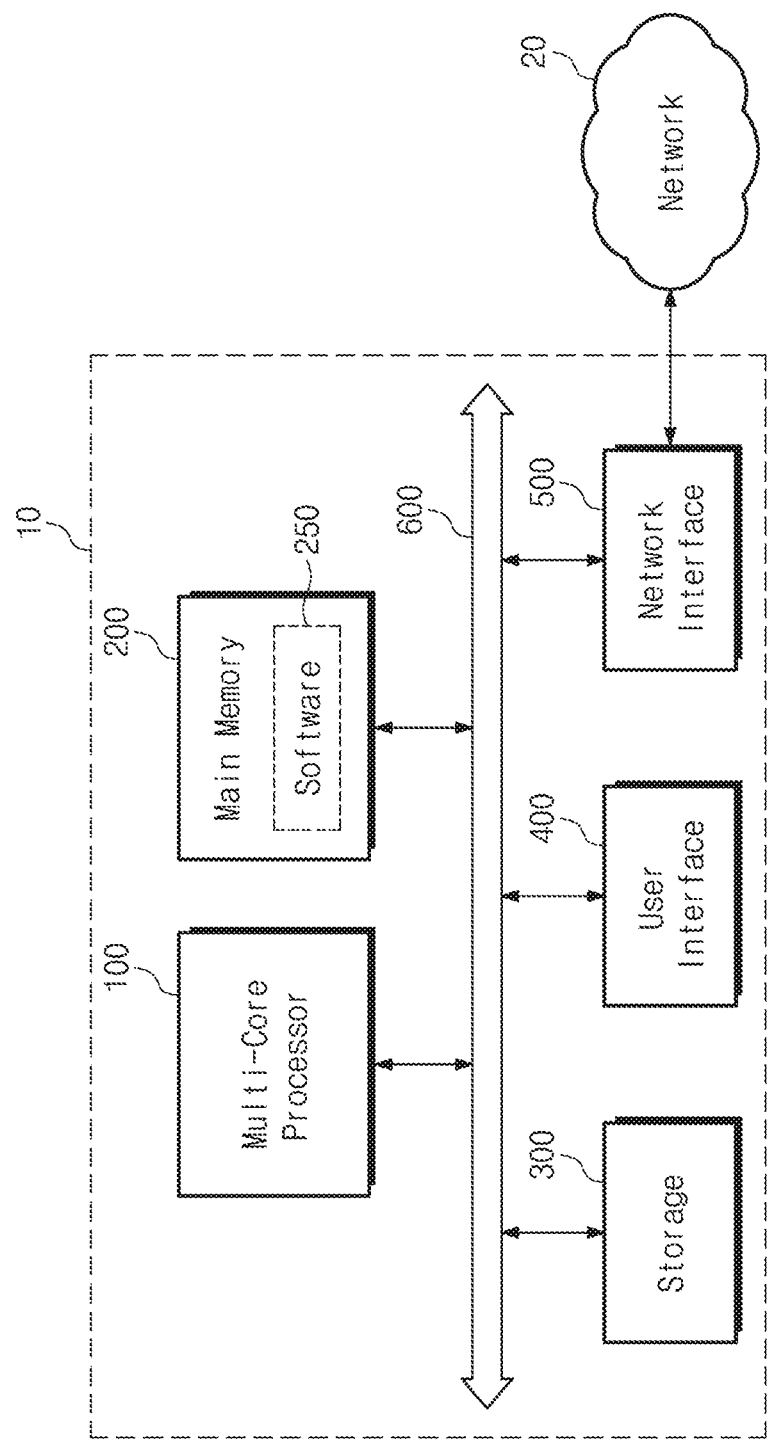
FIG. 1 is a block diagram illustrating a computer system according to an embodiment of the inventive concept.

FIG. 1 is a schematic block diagram illustrating a computer system 10 according to an embodiment of the inventive concept. Referring to FIG. 1, the computer system 10 may include a multi-core processor 100, a main memory 200, a storage 300, a user interface 400, and a network interface 500 connected to each other via a bus 600.

The multi-core processor 100 is a semiconductor device which executes processing instructions stored in the main memory 200 or the storage 300. The multi-core processor 100 may execute software (an application program, an operating system (OS), or device drivers) to be run on the computer system 10. The multi-core processor 100 may execute software 250 loaded on the main memory 200. The multi-core processor 100 may execute various application programs to be run on an OS. The multi-core processor 100 is a computing component having at least two processors (hereinafter referred to as cores) that are able to be driven individually. Each core may individually read and execute program instructions.

The multi-core processor 100 according to an embodiment of the inventive concept may operate in two operation modes, i.e., a dual-modular redundancy (DMR) mode and a non-DMR mode. In the DMR mode, processor cores operate as at least one leading core or at least one trailing core. That is, in the DMR mode, at least two processor cores perform the same task. However, in the DMR mode, only a leading core is authorized to write data to the main memory 200. In the DMR mode, a trailing core is unable to apply a calculation result thereof to the main memory 200, and is controlled so as not to change registers of a peripheral device. On the contrary, in the non-DMR mode, the processor cores individually process tasks, and individually access the main memory 200.

The software 250 is loaded on the main memory 200 at the time of booting. For example, an OS or application programs may be loaded on the main memory 200 at the time of booting. When the computer system 10 is booted, an OS image stored in the storage 300 is loaded on the main memory 200 on the basis of a booting sequence. Various input/output operations of the computer system 10 may be supported by the OS. Likewise, application programs may be loaded on the working memory 200 when selected by a user or to provide default services. The main memory 200 may be a volatile memory device, for example, a dynamic random access memory (DRAM).

The storage 300 is provided as a storage medium of the computer system 10. The storage 300 may store application programs, an OS image, and various data. The storage 300 may be provided as a memory card (e.g., an MMC, an eMMC, an SD, a MicroSD, or the like), a hard disk drive (HDD), or a solid state drive (SSD).

The user interface 400 provides an interface between the user and the computer system 10. Input or output may be performed using the user interface 400. For example, the user interface 400 may include a liquid crystal display for displaying data in response to control by the multi-core processor 100. Alternatively, the user interface 400 may include an input unit such as a keyboard, a mouse, or a touchpad for transferring a user's input to the computer system 10.

The network interface 500 connects the computer system 10 to a network 20 via a wireless or wired channel. The network interface 500 may include a communication module corresponding to at least one of cellular communication, wireless LAN communication, or Bluetooth communication. The network interface 500 may be a modem for connecting the network 20 through a coaxial cable, an optical fiber cable, or the like.

An operation mode of the multi-core processor 100 according to an embodiment of the inventive concept may be selected by the software 250. That is, a function called when the software 250 is executed may choose whether to operate the multi-core processor 100 in the DMR mode or in the non-DMR mode. This operation will be described in detail with reference to the drawings.

Figure 2:
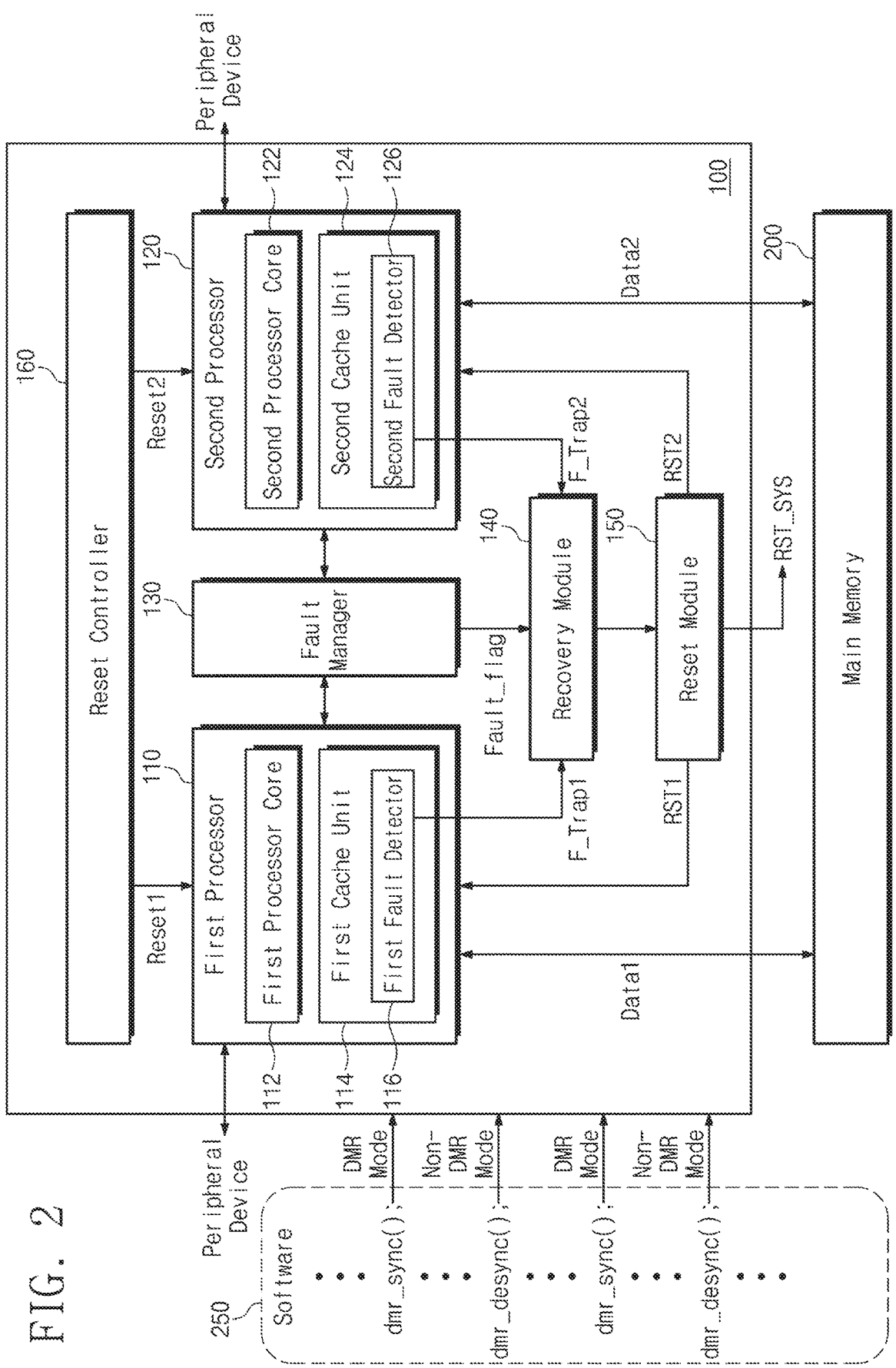
FIG. 2 is a block diagram illustrating the multi-core processor of FIG. 1.

FIG. 2 is a block diagram illustrating the multi-core processor of FIG. 1. Referring to FIG. 1, the multi-core processor 100 according to an embodiment of the inventive concept may include a first processor 110, a second processor 120, a fault manager 130, a recovery module 140, a reset module 150, and a reset controller 160. The multi-core processor 100 accesses the main memory 200 or the peripheral device to read or write data.

The first processor 110 may include a first processor core 112 and a first cache unit 114. The first processor core 112 performs calculations for performing a task in the first processor 110. The first cache unit 114 provides a cache function to the first processor core 112.

In the non-DMR mode, the first processor 110 exchanges data Data1 with the main memory 200 using the first cache unit 114. The data Data1 includes readout data read from the main memory 200 and write-in data which is generated by the first processor 110 and written to the main memory 200. Although the data exchange between the first processor 110 and the main memory 200 has been described, it could be understood that the first processor 110 may also exchange data with the peripheral device.

The first processor 110 stores, in the first cache unit 114, data generated from an execution result of a program. Synchronization between the first cache unit 114 and the main memory 200 is managed by means of a dirty bit. The first cache unit 114 may include a first fault detector 116 for detecting whether there exists a fault in data of the first cache unit 114. The first fault detector 116 detects a fault in data stored in the first cache unit 114, and transfers, to the recovery module 140, a trap signal F_trap1 for recovering from the fault.

On the contrary, in the DMR mode, the data stored in the first cache unit 114 of the first processor 110 is also transferred to the fault manager 130. Data for which fault detection has been completed by the fault manager 130 may be transferred to the main memory 200. In particular, in the DMR mode, only the first processor 110 may write data to the main memory 200 or the peripheral device. In the DMR mode, the second processor 120 may read data from the main memory 200 but is not able to write data thereto. Readout data provided from the main memory 200 is stored in the first cache unit 114, and is transferred to the fault manager 130. The first processor 110 may read a program loaded on the main memory 200 to sequentially execute the program.

The second processor 120 may include a second processor core 122 and a second cache unit 124. The second processor core 122 performs calculations for processing various programs in the second processor 120. The second cache unit 124 provides a cache function to the second processor core 122. The second processor 120 exchanges data Data2 with the main memory 200 or the peripheral device in the non-DMR mode. That is, in the non-DMR mode, the second processor 120 may read or write data from/to the main memory 200 or the peripheral device.

In the non-DMR mode, the second processor 120 may read programs loaded on the main memory 200 to sequentially execute the programs. Here, the second processor 120 stores, in the second cache unit 124, data which is updated frequently or at high speed. The second processor 120 stores, in the second cache unit 124, data generated from an execution result of a program. The second cache unit 124 may include a second fault detector 126 for detecting presence of a fault in cached data. The second fault detector 126 detects a fault in data stored in the second cache unit 124, and transfers, to the recovery module 140, a trap signal F_trap2 for recovering from the fault.

In the DMR mode, the data stored in the second cache unit 124 of the second processor 120 is prevented from being written to the main memory 200 and is only transferred to the fault manager 130. The fault manager 130 may compare the data (including an address) transferred from the first processor 110 with the data transferred from the second processor 120 to determine presence of a fault of the multi-core processor 100. Data returned from the fault manager 130 is stored in the second cache unit 124. However, in the DMR mode, the second processor 120 is allowed to only read data from the main memory 200 and is prevented from writing data thereto. Therefore, in the DMR mode, it is not necessary for the second cache unit 124 to perform dirty bit management.

The fault manager 130 may receive, from each of the first processor 110 and the second processor 120, register value DMR_EN or DMR_DIS for activating the DMR mode. In the DMR mode, the fault manager 130 compare data provided from the first processor 110 and the second processor 120 to determine whether a calculation fault occurs. When the data provided from the first processor 110 and the second processor 120 are not identical, the fault manager 130 determines the multi-core processor 100 as having an operation fault. Furthermore, the fault manager 130 transfers a fault flag signal Fault_flag to the recovery module 140. On the contrary, when values of DMR registers (not shown) written in the first processor 110 and the second processor 120 indicate disablement (DMR_DIS), the fault manager 130 only performs a reset operation on each core according to the non-DMR mode without performing a fault detection operation.

When an operation fault of the first processor 110 and the second processor 120 is detected, the recovery module 140 performs various control operations for recovering from a detected fault. In the non-DMR mode, the recovery module 140 may perform a fault recovery operation in response to a fault trap signal F_Trap1 from the first fault detector 116 of the first processor 110. Furthermore, the recovery module 140 may perform the fault recovery operation in response to a fault trap signal F_Trap2 from the second fault detector 126 of the second processor 120. Furthermore, in the DMR mode, the recovery module 140 may perform the fault recovery operation in response to the fault flag signal Fault_flag provided from the fault manager 130.

The reset module 150 may reset the first processor 110 or the second processor 120 in response to control by the recovery module 140. In addition, the reset module 150 may generate, in response to control by the recovery module 140, a system reset signal RST_SYS for resetting a system including the multi-core processor 100.

The reset controller 160 resets the first processor 110 and the second processor 120 according to DMR register values. For example, when DMR mode values are written to the DMR registers while the first processor 110 and the second processor 120 are operating in the non-DMR mode, the reset controller 160 resets the first processor 110 and the second processor 120. The first processor 110 and the second processor 120 may be set as identical core IDs after being reset. Alternatively, when non-DMR mode values are written to the DMR registers while the first processor 110 and the second processor 120 are operating in the DMR mode, the reset controller 160 resets the first processor 110 and the second processor 120. After being reset, the first processor 110 and the second processor 120 may be assigned different core IDs for performing different tasks.

The operation mode of the multi-core processor 100, which operates in the DMR mode or the non-DMR mode, according to an embodiment of the inventive concept may be changed according to a function called in the software 250. That is, when a function 'dmr_sync( )' is called in the software 250, the multi-core processor 100 suspends various processes operating in the non-DMR mode. Furthermore, the first and second processors 110 and 120 are assigned the same core ID after being reset. Since the same core ID is assigned to the first and second processors 110 and 120, the first and second processors 110 and 120 may perform the same task. However, even though the processors perform the same task, only one processor (e.g., a leading core) is allowed to access the main memory 200.

On the contrary, when a function 'dmr_desync( )' is called in the software 250, the multi-core processor 100 terminates the DMR mode in which the same task has been being performed. Thereafter, the first processor 110 and the second processor 120 are reset. After being reset, the first and second processors 110 and 120 are assigned different core IDs to operate individually. Since different core IDs are assigned to the first and second processors 110 and 120, the first and second processors 110 and 120 may operate independently of each other, and may perform different tasks. That is, the first processor 110 and the second processor 120 may individually access the main memory 200, and may set peripheral registers.

Figure 3:
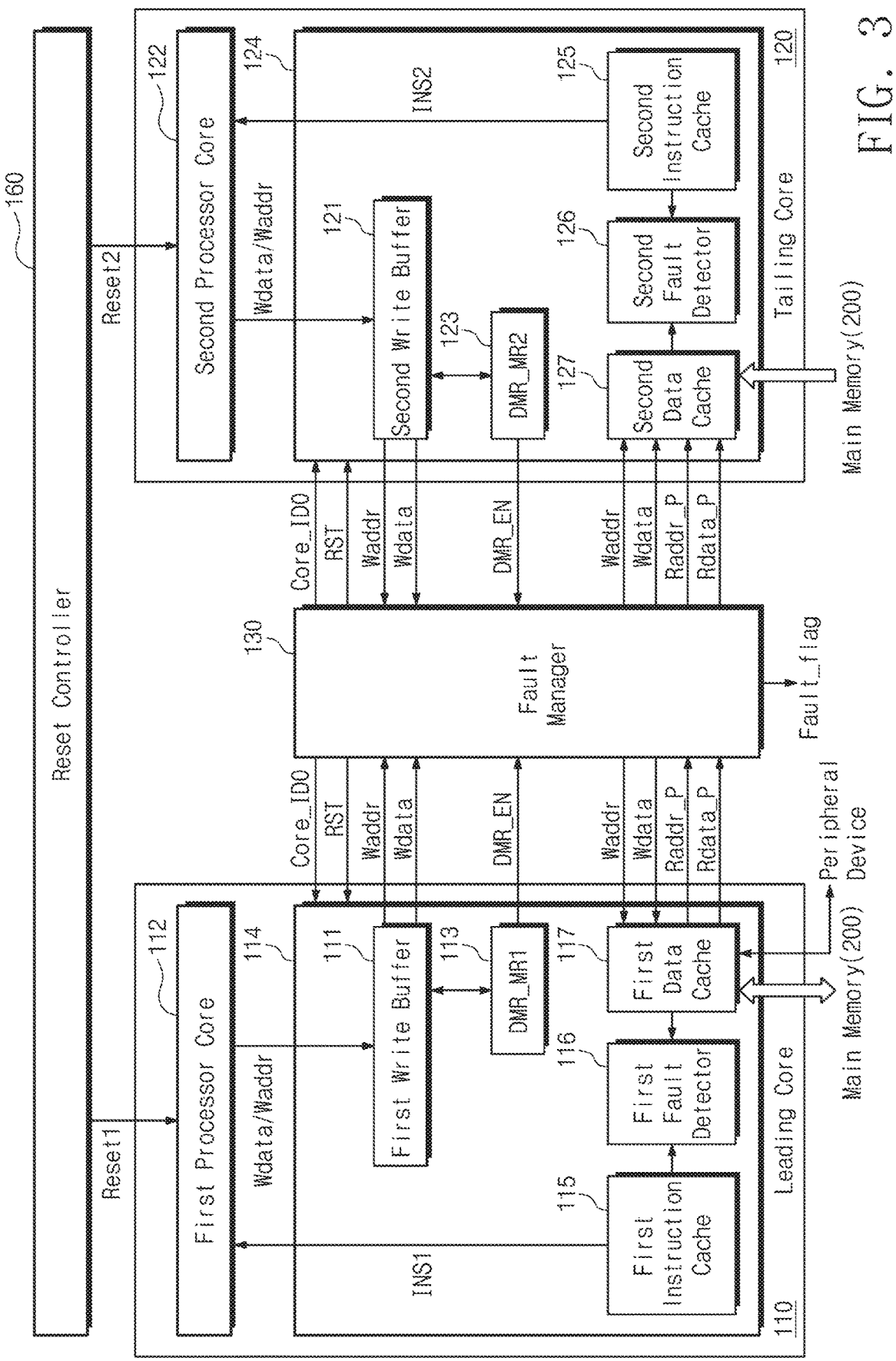
FIG. 3 is a block diagram illustrating a function of a multi-core processor in a dual-modular redundancy (DMR) mode according to an embodiment of the inventive concept.

FIG. 3 is a block diagram illustrating in detail a function of a multi-core processor in the DMR mode according to an embodiment of the inventive concept. Referring to FIG. 3, in the DMR mode, the first processor 110 operates as a leading core, and the second processor 120 operates as a trailing core. Furthermore, the fault manager 130 detects an operation fault on the basis of data provided from caches of the first processor 110 and the second processor 120.

When the function 'dmr_sync( )' is called in the software 250 (see FIG. 2), the first processor 110 and the second processor 120 suspend various processes operating in the non-DMR mode. In response to the function 'dmr_sync( )' the first processor core 112 may write the DMR enablement value DMR_EN to a first DMR register 113, and the second processor core 122 may write the DMR enablement value DMR_EN to a second DMR register 123. The fault manager 130, which has confirmed the DMR enablement value DMR_EN written in the DMR registers 113 and 123, may perform a fault detection operation according to the DMR mode. Furthermore, the reset controller 160 may reset the first and second processor cores 112 and 122.

Thereafter, the fault manager 130 assigns the same core ID to the first and second processor cores 112 and 122. For example, the fault manager 130 may assign a core ID Core_ID0 to the first processor core 112, and may also assign the core ID Core_ID0 to the second processor core 122. While having the same core ID, the first and second processor cores 112 and 122 may perform the same task when performing scheduled tasks. Here, an entity for assigning core IDs to the first and second processor cores 112 and 122 is not limited to the fault manager 130. Any one of various elements for controlling the multi-core processor may assign core IDs to the first and second processor cores 112 and 122.

For an operation according to the DMR mode, the first cache unit 114 included in the first processor 110 may include a first write buffer 111, the first DMR register 113, a first instruction cache 115, the first fault detector 116, and a first data cache 117. Furthermore, the second cache unit 124 included in the second processor 120 may include a second write buffer 121, the second DMR register 123, a second instruction cache 125, the second fault detector 126, and a second data cache 127.

In the DMR mode, the first processor 110, which operates as a leading core, is authorized to read and write data from/to the main memory 200 or the peripheral device. That is, the first processor 110 may transfer a write-in address Waddr and write-in data Wdata to the main memory 200, or may receive a readout address Raddr and readout data Rdata from the main memory 200. On the contrary, in the DMR mode, the second processor 120, which operates as a trailing core, is allowed to only read data from the main memory 200 and is prevented from writing data thereto. Furthermore, in the DMR mode, the second processor 120 is prevented from exchanging data with the peripheral device. In other words, in the DMR mode, the second processor 120 generates the write-in address Waddr and the write-in data Wdata. However, in the DMR mode, the second processor 120 does not transfer the write-in address Waddr and the write-in data Wdata to the main memory 200. Instead, in the DMR mode, the second processor 120 provides the write-in address Waddr and the write-in data Wdata only to the fault manager 130.

In detail, in the DMR mode, the first processor core 112, which operates as a leading core, may generate and write the write-in address Waddr and the write-in data Wdata to the first write buffer 111. Then, the write-in address Waddr and the write-in data Wdata written in the first write buffer 111 are transferred to the fault manager 130. Likewise, the second processor core 122, which operates as a trailing core, may perform the same task as the first processor core 112. The second processor core 122 may generate and write the write-in address Waddr and the write-in data Wdata to the second write buffer 121. Then, the write-in address Waddr and the write-in data Wdata written in the second write buffer 121 are transferred to the fault manager 130.

In the DMR mode, the fault manager 130 compares the write-in addresses Waddr and the write-in data Wdata provided from the first write buffer 111 and the second write buffer 121. Furthermore, after the comparison, the fault manager 130 returns the write-in addresses Waddr and the write-in data Wdata to the first data cache 117 and the second data cache 127. If the write-in addresses Waddr and the write-in data Wdata provided from the first write buffer 111 and the second write buffer 121 are different from each other, the fault manager 130 determines an operation fault. Furthermore, the fault manager 130 may transfer a fault flag or fault trap information to the recovery module 140 (see FIG. 2). Here, the first fault detector 116 included in the first cache unit 114 or the second fault detector 126 included in the second cache unit 124 may monitor a fault of the first data cache 117 and the second data cache 127 and may transfer the fault trap information to the recovery module 140.

The write-in address Waddr and the write-in data Wdata stored in the first data cache 117 may use a dirty bit to synchronize with the main memory 200 both in the non-DMR mode and in the DMR mode. However, in the DMR mode, it is not necessary to apply a dirty bit to the write-in address Waddr and the write-in data Wdata stored in the second data cache 127. This is because a data writing operation between the second data cache 127 and the main memory 200 does not occur in the DMR mode.

In the DMR mode, the readout address Raddr_P and the readout data Rdata_P transferred from the peripheral device are preferentially stored only in the first data cache 117. Furthermore, the readout address Raddr_P and the readout data Rdata_P stored in the first data cache 117 may be transferred to the second data cache 127 after being transferred to the fault manager 130. In particular, in the DMR mode, an operating frequency of the first processor 110, which is a leading core, may be higher than an operating frequency of the second processor 120, which is a trailing core. In the DMR mode, the first processor 110 and the second processor 120 may individually perform a reading operation on the main memory 200. Accordingly, in the DMR mode, processing times of the first processor 110 and the second processor 120 may randomly vary due to the different operating frequencies even though the first processor 110 and the second processor 120 perform the same task. Due to asynchronism caused by the difference between operating frequencies, a temporal redundancy may be additionally provided.

As described above, according to a function related to the DMR mode and called in the software 250, the multi-core processor 100 according to an embodiment of the inventive concept may switch an operation mode between the DMR mode and the non-DMR mode. The functions 'dmr_sync( )' and 'dmr_desync( )' are exemplarily illustrated as functions related to the DMR mode. When the function 'dmr_sync( )' is called, the first and second processor cores 112 and 122 are assigned the same core ID after being reset. Here, only the first processor 110, which operates as a leading core, is authorized to access the main memory 200. On the contrary, the second processor 120, which operates as a trailing core, is prevented from accessing the main memory 200. According to the above-mentioned multi-core processor 100, a DMR mode function may be easily controlled at a software level such as application programs.

Figure 4:
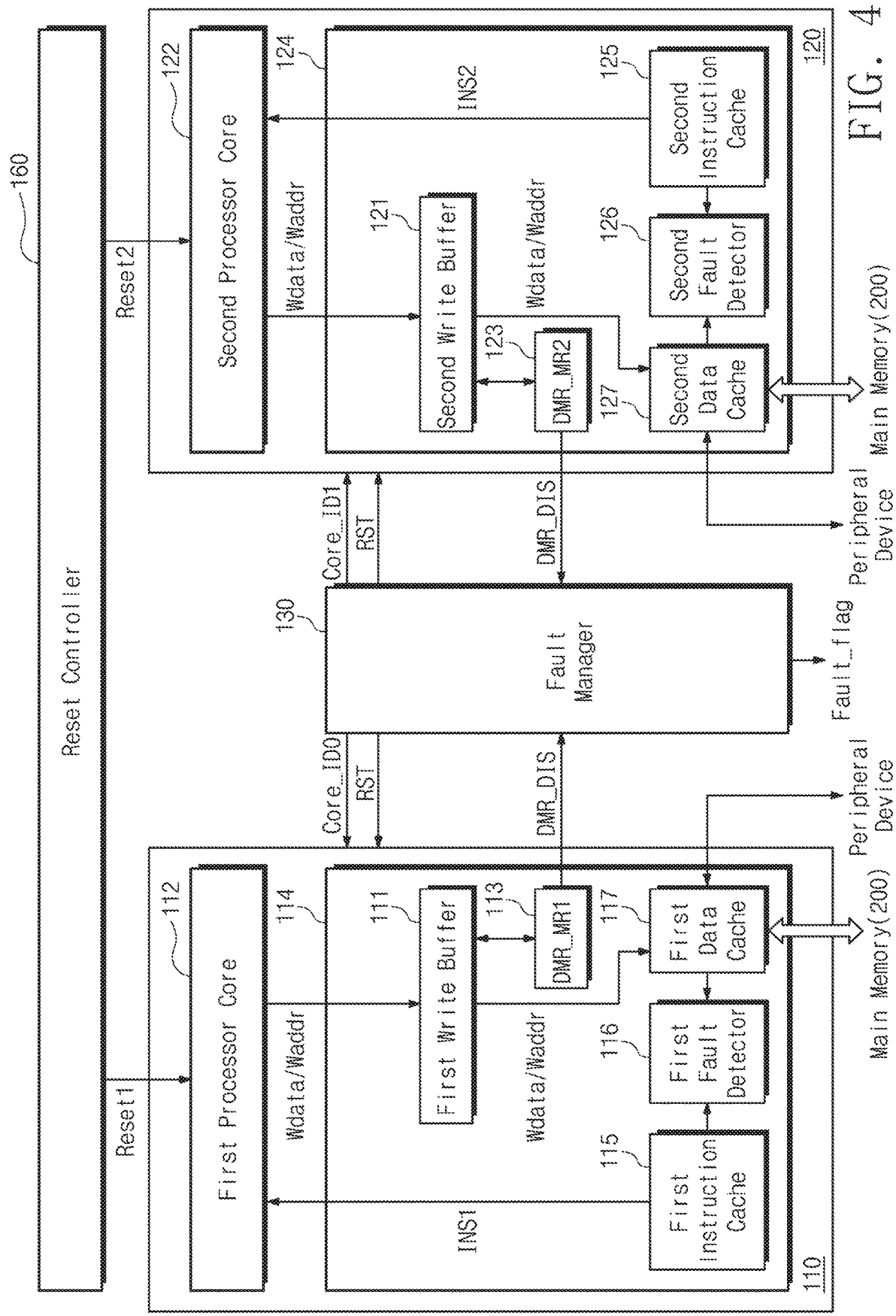
FIG. 4 is a block diagram illustrating a function of a multi-core processor in a non-DMR mode according to an embodiment of the inventive concept.

FIG. 4 is a block diagram illustrating a function of a multi-core processor in the non-DMR mode according to an embodiment of the inventive concept. Referring to FIG. 4, in the non-DMR mode, the first processor 110 and the second processor 120 may individually perform tasks, and may individually access the main memory 200 and the peripheral device. In the non-DMR mode, the fault detection operation of the fault manager 130 is inactivated. Furthermore, the fault manager 130 may assign different core IDs to the first processor 110 and the second processor 120.

Here, the first processor core 112, the first cache unit 114, the second processor core 122, the second cache unit 124, and the fault manager 130 are substantially the same as those illustrated in FIG. 2. However, in the non-DMR mode, the first processor 110 and the second processor 120 may individually access the main memory 200.

The first cache unit 114 included in the first processor 110 may include the first write buffer 111, the first DMR register 113, the first instruction cache 115, the first fault detector 116, and the first data cache 117. Furthermore, the second cache unit 124 included in the second processor 120 may include the second write buffer 121, the second DMR register 123, the second instruction cache 125, the second fault detector 126, and the second data cache 127.

When the function 'dmr_desync( )' is called in the software 250 (see FIG. 2), the first processor 110 and the second processor 120 suspend various processes operating in the DMR mode. In response to the function 'dmr_desync( )' the first processor core 112 may write the DMR disablement value DMR_DIS to the first DMR register 113, and the second processor core 122 may write the DMR disablement value DMR_DIS to the second DMR register 123. The fault manager 130, which has confirmed the DMR disablement value DMR_DIS written in the DMR registers 113 and 123, suspends the fault detection operation. Furthermore, the reset controller 160 may reset the first and second processor cores 112 and 122 which have previously operated in the DMR mode. That is, the reset controller 160 transfers a reset signal Reset1 to the first processor core 112 that has operated in the DMR mode. The reset controller 160 transfers a reset signal Reset2 for resetting the second processor core 122 that has operated in the DMR mode.

Thereafter, the fault manager 130 assigns different core IDs Core_ID0 and Core_ID1 to the first and second processor cores 112 and 122. For example, the fault manager 130 may assign the core ID Core_ID0 to the first processor core 112, and may assign the core ID Core_ID1 to the second processor core 122. While having different core IDs, the first and second processor cores 112 and 122 may perform scheduled different tasks. Here, it could be understood that an entity for assigning core IDs to the first and second processor cores 112 and 122 is not limited to the fault manager 130.

The first processor 110 and the second processor 120 which have been assigned different core IDs Core_ID0 and Core_ID1 may perform a non-DMR mode operation as described below. The first processor 110 writes data to the main memory 200 without transferring the data to the fault manager 130, and reads data from the main memory 200. That is, the write-in address Waddr and the write-in data Wdata generated by the first processor core 112 may be directly transferred from the first write buffer 111 to the first data cache 117. Furthermore, the write-in address Waddr and the write-in data Wdata stored in the first data cache 117 may be written to the main memory 200.

The second processor 120 may generate data regardless of operation of the first processor 110, and may write the generated data to the main memory 200. That is, the second processor 120 writes data to the main memory 200 and reads data therefrom regardless of a task being performed in the first processor 110. For example, the write-in address Waddr and the write-in data Wdata generated by the second processor core 122 may be directly transferred from the second write buffer 121 to the second data cache 117. Furthermore, the write-in address Waddr and the write-in data Wdata stored in the second data cache 127 may be written to the main memory 200.

As described above, in the non-DMR mode, the fault manager 130 is disabled. Furthermore, the first processor 110 and the second processor 120 may individually perform tasks and may individually access the main memory 200.

The multi-core processor 100 has been described as a dual-core processor in order to describe embodiments of the inventive concept. However, it could be understood that a plurality of processors are not limited to a dual-core processor. That is, three or more processors may operate as a leading core or a trailing core according to an operation mode.

FIG. 5 is a schematic flowchart illustrating operation of the multi-core processor of FIG. 2. Referring to FIG. 5, the multi-core processor 100 controls operation modes of the first processor 110 and the second processor 120 according to a DMR mode control function called by software.

In operation S110, the multi-core processor 100 may detect an event for which a DMR mode change is required. For example, in the case where each core individually performs a task, the multi-core processor 100 may operate in the non-DMR mode. On the contrary, in the case where high reliability is required from a calculation result of each core, the multi-core processor 100 may operate in the DMR mode.

In operation S120, as an example of a DMR mode change event, a DMR function may be referred to, which is called by the software 250 (see FIG. 2) such as an application program or a default program. When the called function is 'dmr_sync( )', the process proceeds to operation S130. On the contrary, when the called function is 'dmr_desync( )', the process proceeds to operation S160. The function 'dmr_sync( )' is a function for operating the multi-core processor 100 in the DMR mode. On the contrary, the function 'dmr_desync( )' is a function for operating the multi-core processor 100 in the non-DMR mode.

In operation S130, the multi-core processor 100 may write the DMR enablement value DMR_EN to each of the registers 113 and 123. That is, the first processor core 112 may write the DMR enablement value DMR_EN to the first DMR register 113, and the second processor core 122 may write the DMR enablement value DMR_EN to the second DMR register 123. Then, the fault manager 130, which has confirmed the DMR enablement value DMR_EN written in the DMR registers 113 and 123, may perform the fault detection operation according to the DMR mode. Furthermore, the reset controller 160 may reset the first and second processor cores 112 and 122.

In operation S140, the fault manager 130 assigns the same core ID to the first processor core 112 and the second processor core 122.

In operation S150, while having the same core ID, the first and second processor cores 112 and 122 may perform the same task when performing scheduled tasks. In addition, data stored in the first cache unit 114 and the second cache unit 124 are provided to the fault manager 130 so as to be compared. The fault manager 130 detects a fault from the data provided from the first cache unit 114 and the second cache unit 124. Thereafter, the fault manager 130 returns data to the first cache unit 114 and the second cache unit 124. The returned data is stored in the first data cache 117 and the second data cache 127. However, the data cached in the first data cache 117 may be written to the main memory 200, but the data cached in the second data cache 127 is unable to be written to the main memory 200. The above-mentioned cache management operation may continue during activation of the DMR mode. In particular, in the DMR mode, the operating frequency of the first processor 110, which is a leading core, may be higher than the operating frequency of the second processor 120, which is a trailing core. In the DMR mode, the first processor 110 and the second processor 120 may individually perform a reading operation on the main memory 200. Accordingly, in the DMR mode, processing times of the first processor 110 and the second processor 120 may randomly vary due to the different operating frequencies even though the first processor 110 and the second processor 120 perform the same task. Due to asynchronism caused by the difference between operating frequencies, a temporal redundancy may be additionally provided.

In operation S160, the multi-core processor 100 may write the DMR disablement value DMR_DIS to each of the DMR registers 113 and 123. That is, the first processor core 112 may write the DMR disablement value DMR_DIS to the first DMR register 113, and the second processor core 122 may write the DMR disablement value DMR_DIS to the second DMR register 123. Then, the fault manager 130, which has confirmed the DMR disablement value DMR_DIS written in the DMR registers 113 and 123, may suspend the fault detection operation according to the DMR mode. Furthermore, the reset controller 160 may reset the first and second processor cores 112 and 122.

In operation S170, the fault manager 130 assigns different core IDs to the first processor core 112 and the second processor core 122. Therefore, the first processor core 112 and the second processor core 122 are recognized as different cores by the software 250.

In operation S180, while having different core IDs, the first and second processor cores 112 and 122 may perform scheduled different tasks. In addition, data stored in the first cache unit 114 and the second cache unit 124 are not provided to the fault manager 130. The data stored in the first cache unit 114 and the second cache unit 124 are transferred to the main memory 200. That is, each of the data cached in the first data cache 117 and the data cached in the second data cache 127 is transferred to the main memory 200. The above-mentioned cache management operation may continue during activation of the non-DMR mode.

Described above is operation of the multi-core processor which operates in the DMR mode or the non-DMR mode according to a function called by the software 250. According to the multi-core processor 100 according to embodiments of the inventive concept, each processor core may be controlled at a software level such that each processor core may perform the same task or different tasks.

A multi-core processor according to an embodiment of the inventive concept efficiently detects and corrects a fault of a multi-core having a variable redundancy function. Therefore, high reliability of a multi-core processor may be provided.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A multi-core processor having a first operation mode in which processors perform a same task and a second operation mode in which the processors perform different tasks, the multi-core processor comprising:
   a first processor and a second processor configured to write an operation mode value to a first register or a second register when a function called in executed software requests the first operation mode or the second operation mode;
   a manager configured to assign core IDs of the first processor and the second processor according to the operation mode value written in the first register or the second register; and
   a reset controller configured to reset the first processor and the second processor in response to the function,
   wherein the manager assigns a same core ID to the first processor and the second processor when the operation mode value indicates the first operation mode, and allocates different core IDs to the first processor and the second processor when the operation mode value indicates the second operation mode.

2. The multi-core processor of claim 1, wherein the first processor comprises:
   a first processor core configured to generate first write-in data; and
   a first cache unit comprising a first data cache configured to transfer the first write-in data to a main memory in the first operation mode.

3. The multi-core processor of claim 2, wherein the first cache unit comprises:
   a first write buffer configured to store the first write-in data transferred from the first processor core;
   a first register which is connected to the first write buffer and in which the operation mode value is stored; and
   a first fault detector configured to detect a fault in the first write-in data stored in the first data cache.

4. The multi-core processor of claim 3, wherein the second processor comprises:
   a second processor core configured to generate second write-in data; and
   a second cache unit which provides the second write-in data to the manager and is prevented from writing data to the main memory in the first operation mode.

5. The multi-core processor of claim 4, wherein the manager is configured to return the second write-in data to the second processor based on detection of the fault, and wherein the second cache unit comprises:
   a second write buffer configured to store the second write-in data and transfer the stored second write-in data to the manager;
   a second register which is connected to the second write buffer and to which information indicating whether to activate the first operation mode is written; and
   a second data cache configured to store the second write-in data returned from the manager.

6. The multi-core processor of claim 5, wherein the second data cache does not generate a dirty bit of the second write-in data.

7. The multi-core processor of claim 5, wherein the second cache unit further comprises a second fault detector configured to detect a fault in the second write-in data stored in the second data cache.

8. The multi-core processor of claim 1, wherein, in the first operation mode, the manager detects a fault by comparing data generated by the first processor and the second processor.

9. The multi-core processor of claim 8, further comprising a recovery module configured to receive a result of error detection from the manager and correct a fault of the first processor and the second processor in the first operation mode.

10. The multi-core processor of claim 1, wherein the first processor and the second processor operate at different operating frequencies in the first operation mode.

11. The multi-core processor of claim 8, wherein an operating frequency of the first processor is higher than an operating frequency of the second processor in the first operation mode.

12. A method for operating a multi-core processor having a first operation mode in which processors perform a same task and a second operation mode in which the processors perform different tasks, the method comprising:
   detecting whether a function of software executed in the first processor or the second processor requests a change to one of the first operation mode or the second operation mode;
   setting a first register included in the first processor or a second register included in the second processor according to a result of the detecting;
   resetting the first processor and the second processor; and
   assigning core IDs of the first processor and the second processor,
   wherein the first processor and the second processor are assigned a same core ID when an operation mode value set in the first register or the second register corresponds to the first operation mode, and the first processor and the second processor are assigned different core IDs when the operation mode value set in the first register or the second register corresponds to the second operation mode.

13. The method of claim 12, further comprising detecting a fault by comparing data generated by the first processor and the second processor in the first operation mode.

14. The method of claim 12, wherein, in the first operation mode, the first processor is allowed to access a main memory, and the second processor is prevented from writing data to the main memory.

15. The method of claim 12, further comprising recovering from, when the fault is detected, an operation fault of the first processor and the second processor.

* * * * *